US006958125B2

(12) United States Patent
Hiroki

(10) Patent No.: US 6,958,125 B2
(45) Date of Patent: Oct. 25, 2005

(54) METHOD FOR MANUFACTURING LIQUID JET RECORDING HEAD

(75) Inventor: Tomoyuki Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 09/742,433

(22) Filed: Dec. 22, 2000

(65) Prior Publication Data

US 2001/0004805 A1 Jun. 28, 2001

(30) Foreign Application Priority Data

Dec. 24, 1999 (JP) ........................................... 11-365868
Dec. 24, 1999 (JP) ........................................... 11-365901

(51) Int. Cl.[7] ........................ G01D 15/00; G11B 5/127; B41J 2/14; B41J 2/16

(52) U.S. Cl. ............................ 216/27; 216/41; 216/47; 216/46; 216/58; 216/83; 216/56; 347/47

(58) Field of Search ............................ 216/27, 41, 47, 216/46, 58, 83, 56, 67, 72, 33, 48, 44, 97; 347/47, 45, 65, 68, 70, 20; 118/715; 156/345.29, 272.2, 272.8, 273.5; 219/121.17, 121.66, 121.77; 438/22, 749, 754; 29/25.35

(56) References Cited

U.S. PATENT DOCUMENTS 4,875,968 A * 10/1989 O'Neill et al. ................ 216/27
5,126,768 A * 6/1992 Nozawa et al. ............... 216/27
5,684,519 A * 11/1997 Matoba et al. ................ 347/20
5,754,205 A * 5/1998 Miyata et al. ............. 29/25.35
5,984,458 A * 11/1999 Murai ......................... 347/70
5,992,974 A * 11/1999 Miyata ........................ 347/47

* cited by examiner

*Primary Examiner*—Rudy Zervigon
(74) *Attorney, Agent, or Firm*—Fitzpatrick, Cella, Harper & Scinto

(57) ABSTRACT

A method for manufacturing a liquid jet recording head having an element substrate provided with a plurality of discharge energy generating elements for applying discharging energy to a recording liquid in accordance with image data, a liquid chamber for storing the recording liquid, and a top plate having a plurality of nozzles, is provided. The method includes a step of forming, on an anisotropic-etching mask layer provided on a nozzle surface of the top plate, compensation patterns extending to a liquid chamber region in order to form the nozzles and the liquid chamber by anisotropic etching, and a step of performing anisotropic etching of the top plate through the mask layer and forming the liquid chamber to have a substantially rectangular shape at the nozzle surface of the top plate by over-etching portions with the compensation patterns.

7 Claims, 9 Drawing Sheets

METHOD FOR MANUFACTURING LIQUID JET RECORDING HEAD

BACKGROUND OF THE INVENTION

1. Field of the Invention

The present invention relates to a method for manufacturing a liquid jet recording head which performs recording on a recording medium with droplets of recording liquid ejected from a fine discharge opening.

2. Description of the Related Art

A liquid jet recording head such as a thermal ink jet printing head, etc., employed in a liquid jet recording device comprises a plurality of fine nozzles (discharge openings) which eject recording liquid such as ink, etc., liquid chambers each of which is connected to one of the nozzles, and discharge energy generating elements (for example, a heater such as an electrothermal conversion element) each of which is placed in one of the nozzles. Recording is performed by applying driving signals corresponding to the information to be recorded to the discharge energy generating elements, supplying the discharge energy to the recording liquid inside the nozzle in which the discharge energy generating element is placed, and discharging flying droplets of the recording liquid from the fine nozzle.

There are various types of nozzles suggested for use in this type of liquid jet recording head, and one example is explained with reference to FIG. 7.

In FIG. 7, reference numeral 101 denotes a top plate (nozzle member) formed by a silicon wafer which is cut and polished so that the upper surface thereof comprises the <110> crystal plane. The top plate 101 is provided with a liquid chamber 102 which is a hole formed through the top plate 101 and serves to retain the recording liquid therein, and a plurality of nozzle grooves 103 (hereinafter referred to simply as "nozzles"), connected to the liquid chamber 102, for discharging the recording liquid. An element substrate 108 (a heater board 108) comprises a silicon chip in which a number of heating members (heaters) 109 are provided as the discharge energy generating elements.

As shown in FIG. 7, the top plate 101 and the heater board 108 are closely jointed or bonded so that each of the nozzles 103 is arranged to oppose the respective heater 109. The nozzles 103 and the surface of the heater board 108 constitute thin and long discharge nozzles. At this time, the positions of the top plate 101 and the heater board 108 are precisely adjusted to ensure that each of the heaters 109 is placed inside the respective nozzle 103. The recording liquid is supplied from a recording liquid tank (not shown) to the liquid chamber 102 and reaches the nozzles 103. The heaters 109 on the heater board 108 are controlled by a controlling circuit (also not shown) and are individually energized according to printing data. The controlling circuit may be placed on the heater board 108 or may be formed on another substrate.

Each of the heaters 109 individually energized according to the printing data emits heat so as to heat the recording liquid contained in the nozzle 103. The heated recording liquid boils when a crucial temperature is reached and generates bubbles. These bubbles grow in a short period of time, i.e., in several μs, and provide an impact force to the recording liquid. Part of the recording liquid is pushed out from the discharge opening of the nozzle 103 as flying droplets due to the significant force of this impact and reaches the recording medium such as a sheet of paper, etc. An image is printed by repeating these steps.

Next, a method for manufacturing the top plate (nozzle member) 101 will be explained with reference to FIGS. 8A to 8H and FIGS. 8A' to 8H', according to steps thereof. It should be noted here that FIGS. 8A to 8H on the left side are sectional views taken along a plane along the liquid discharging direction and FIGS. 8A' to 8H' on the right side are end views viewed from the lower side (the surface provided with nozzles) of the top plate.

In FIGS. 8A and 8A', a silicon wafer 105 which constitutes the top plate (nozzle member) provided with the liquid chamber and the nozzles, has a <110> crystal orientation at the surface and a <111> crystal orientation in the longitudinal direction of the nozzles. A silicon dioxide ($SiO_2$) thin-film 106 of 1 μm in thickness is formed on both sides of the silicon wafer 105 by a deposition process such as a thermal oxidation process or a chemical vapor deposition (CVD) process, as shown in FIGS. 8B and 8B' The silicon dioxide thin-film 106 functions as a mask layer during anisotropic etching of the silicon. Then, one surface (the surface which will be provided with nozzles, hereinafter referred to as the "nozzle surface") of the silicon dioxide thin-film 106 is patterned into a shape of the nozzles and the liquid chamber combined, and the other surface is patterned into a shape of the liquid chamber by using a standard photolithography technique (FIGS. 8C and 8C'). The nozzle surface is coated with a silicon nitride (SiN) layer 107 by a method such as a CVD method (FIGS. 8D and 8D') and is patterned into the shape of the liquid chamber (FIGS. 8E and 8E').

Then, anisotropic etching is performed by immersing the wafer in an etchant such as a 22% tetramethylammonium hydroxide (TMAH) solution. Etching progresses along the exposed portion (i.e., the portion having the shape of the liquid chamber) of the silicon from both sides of the wafer during the anisotropic etching step, resulting in the formation of a through hole (the liquid chamber 102) as etching progresses (FIGS. 8F and 8F').

The shape of etching shown in FIGS. 8F and 8F' will be described below. The main purpose of the anisotropic etching is to form fine nozzles in the top plate (nozzle member) 101. Accordingly, patterning of the nozzles is selectively performed so that the <111> plane of the silicon is parallel to the nozzle wall. When the liquid chamber 102 is substantially rectangular, a shorter side of the liquid chamber (through hole) 102 is left with a perpendicular plane after the etching because the <111> plane is provided perpendicular to the surface of the wafer. In contrast, since a longer side of the liquid chamber (through hole) 102 comprises a number of <111> planes tilted by approximately 30 degrees relative to the wafer surface, the surface of the longer side, composed of a number of planes, is not as perpendicular or smooth as that of the shorter side in a strict sense.

Next, the silicon nitride layer 107 is removed by etching (FIGS. 8G and 8G') to expose the nozzle pattern formed in the silicon dioxide thin-film 106 of FIGS. 8C and 8C'. Anisotropic etching using the TMAH solution is performed again so as to etch the portion corresponding to the nozzles (FIGS. 8C and 8C').

Because the <111> plane perpendicular to the wafer surface is provided in the liquid discharging direction, the cross-section of the nozzles 103 obtained by anisotropic etching is rectangular. In contrast, because there is no surface to inhibit the etching in the longitudinal direction of the nozzle, a nozzle wall 104 (see FIG. 9A) provided between the nozzles is etched from the rear side (the liquid chamber side) as well as the front side of the nozzle, resulting in over-etching in the longitudinal direction, forming an angular shape. Accordingly, the silicon dioxide thin-film serving as a mask layer may remain on the over-etched portion. In order to remove the silicon dioxide thin-film, high-pressure air or high-pressure air containing water is sprayed on the wafer to remove only the silicon dioxide thin-film without damaging the silicon. A pressure of 100 to 200 kPa is sufficient for removing the thin-film of approximately 1 μm in thickness when the method of spraying water by high-pressure air is performed. The entire silicon dioxide thin-film may also be removed by wet etching using a liquid mixture of ammonium fluoride and hydrofluoric acid.

The shape of the top plate (nozzle member) 101 fabricated by the above-described process is shown in FIGS. 9A to 9C. When the patterning is performed to form the liquid chamber, both sides of silicon are patterned substantially the same in the drawings; however, the size of the pattern at the recording liquid supplying side (i.e., the upper surface in FIG. 7) may be reduced as long as a penetrating hole can be formed by anisotropic etching. From the point of view of connection with a recording liquid supplying member (not shown) and securing the wafer strength during the formation of the top plate, it is preferable that the pattern be smaller than that on the nozzle side.

Because the above-described conventional method for fabricating the top plate (nozzle member) employs a silicon anisotropic etching technique to fabricate the top plate, the top plate can be produced by wafer-scale fabrication techniques, enhancing mass-productivity. Also, since a photolithography technique is employed to form the nozzles, the nozzles can be precisely formed with high density. However, the shape of the liquid chamber formed by anisotropic etching is complex, as shown in FIGS. 9A to 9C. More particularly, whereas the <111> plane of silicon is perpendicular to the surface of the side wall in the longitudinal direction of the nozzle, there is no independent <111> plane in the arraying direction of the nozzles and the <111> plane meets the wall surface at an angle of 55 degrees and at an angle of 71 degrees in the nozzle arraying direction. Consequently, when anisotropic etching is performed to form the liquid chamber, the liquid chamber is over-etched in the nozzle direction, leaving these two surfaces at the corners, and the resulting liquid chamber 102 has the complex shape shown in FIGS. 9A to 9C. The liquid chamber is etched for a time period sufficient to form a penetrating hole. Since a typical wafer is approximately 0.6 mm thick from the point of view of strength, the wafer is subjected to anisotropic etching of approximately 0.3 mm in depth when the top plate is fabricated according to the steps shown in FIGS. 8A to 8H and 8A' to 8H'. Since the over-etched amount in the nozzle direction is substantially the same as the depth, the chip size must be undesirably large, resulting in an inefficient chip size, and there is a problem in that the number of chips fabricated from one wafer is significantly reduced. Also, because the angled surfaces relative to the nozzle arraying direction remain in the vicinity of the liquid chamber inner side surfaces, flow resistance of the recording liquid differs according to the difference in the shapes of the liquid chamber at both ends and at a center region. In other words, because the conditions for refilling the recording liquid (the nozzles are refilled with recording liquid after being discharged) vary, discharge characteristics vary among the nozzles, causing printing quality to vary and performance of the head to degrade.

SUMMARY OF THE INVENTION

Accordingly, it is an object of the present invention to provide a method for manufacturing a liquid jet recording head in which the chip size of a top plate is reduced by forming a substantially rectangular liquid chamber by anisotropic etching and each nozzle has uniform and stable liquid discharging characteristics so as to achieve superior printing quality.

To this end, the present invention provides a method for manufacturing a liquid jet recording head which includes an element substrate provided with a plurality of discharge energy generating elements for applying discharging energy to a recording liquid corresponding to an image data, a liquid chamber for storing the recording liquid, and a top plate having a plurality of nozzles and which is formed by jointing the element substrate and the top plate so that the respective discharge energy generating element and the respective nozzle faces one another, the method comprising: a step of forming compensation patterns extending to a liquid chamber region, on an anisotropic-etching mask-layer provided on a nozzle surface of the top plate in order to form the nozzles and the liquid chamber by anisotropic etching; and a step of performing anisotropic etching of the top plate through the mask layer and forming the liquid chamber of substantially rectangular shape at the nozzle surface of the top plate by over-etching the portion with the compensation pattern.

Preferably, the top plate is made of a silicon wafer having a surface of <110> plane.

Preferably, the compensation patterns are comb-shaped and are arranged to oppose each other separated by a ladder-shaped opening region provided at the center portion of the liquid chamber region.

More preferably, the compensation patterns are arranged to oppose each other separated by a substantially H-shaped opening region provided at the center portion of the liquid chamber region.

Yet more preferably, the compensation patterns are designed by combining a line having an angle of 55° relative to a <111> plane in the nozzle direction of the silicon wafer and a line having an angle of 71° relative to the same <111> plane, and are arranged to oppose each other separated by an opening region in the center portion of the liquid chamber region.

Most preferably, the compensation patterns are designed by combining a line having an angle of 55° relative to a <111> plane in the nozzle direction of the silicon wafer, a line having an angle of 71° relative to the same <111> plane, and lines extending in parallel to the nozzle arraying direction, and are arranged to oppose each other separated by an opening region in the center portion of the liquid chamber region.

According to the method for manufacturing the liquid jet recording head of the present invention, the compensation patterns extending to the inner portion of the liquid chamber region are additionally provided on the mask layer for anisotropic etching when the top plate (nozzle member) is fabricated by silicon anisotropic etching, and the nozzle surface of the liquid chamber is formed to be substantially rectangular by over-etching the portion with the compensation pattern during the anisotropic etching. Thus, the chip size of the top plate can be reduced, the number of the chips obtained from a wafer is increased, and liquid discharging characteristics of every nozzle can be uniform and stable.

Further objects, features and advantages of the present invention will become apparent from the following description of the preferred embodiments (with reference to the attached drawings).

BRIEF DESCRIPTION OF THE DRAWINGS

FIGS. 2A to 2C are detailed illustrations for explaining steps of forming a liquid chamber according to the method for manufacturing the top plate of the first embodiment of the present invention, wherein FIG. 2A illustrates a state in which a mask pattern for forming the liquid chamber is formed, FIG. 2B illustrates a state in which anisotropic etching for forming the liquid chamber is in progress.

FIGS. 3A to 3C are detailed illustrations for explaining steps for forming a top plate according to a second embodiment of the present invention, wherein FIGS. 3A to 3C illustrate states similar to FIGS. 2A to 2C, respectively;

FIGS. 4A to 4C are detailed illustrations for explaining steps for forming a top plate according to a third embodiment of the present invention, wherein FIGS. 4A to 4C illustrate the states similar to FIGS. 2A to 2C, respectively;

FIGS. 5A to 5C are detailed illustrations for explaining steps for forming a top plate according to a fourth embodiment of the present invention, wherein FIGS. 5A to 5C illustrate the states similar to FIGS. 2A to 2C, respectively;

FIGS. 6A to 6C are detailed illustrations for explaining steps for forming a top plate according a fifth embodiment of the present invention, wherein FIGS. 6A to 6C illustrate states similar to FIGS. 2A to 2C, respectively;

DESCRIPTION OF THE PREFERRED EMBODIMENTS

Now, preferred embodiments of the present invention are described with reference to the drawings.

Figure 1A:
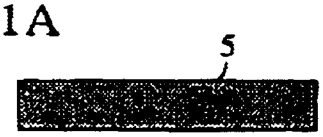
FIGS. 1A to 1H and 1A' to 1H' illustrate in a sequence a process of fabricating a top plate of a liquid jet recording head according to a method for manufacturing a liquid jet recording head of a first embodiment of the present invention.
Figure 1A:
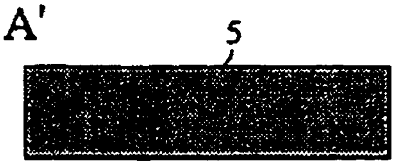
Figure 1B:
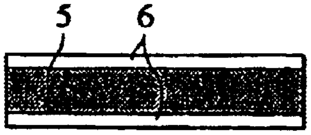
Figure 1B:
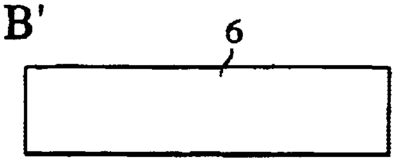
Figure 1C:
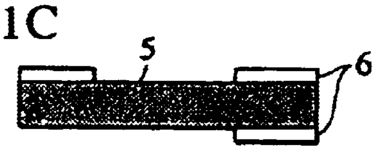
Figure 1C:
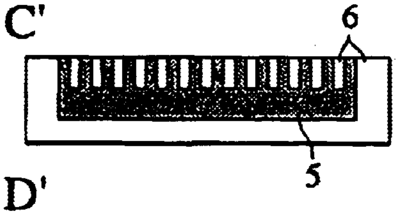
Figure 1D:
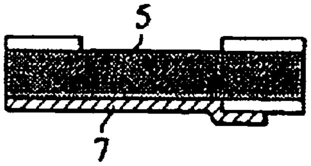
Figure 1D:
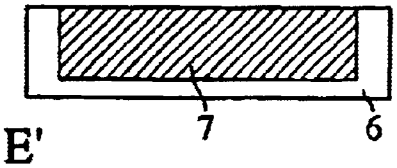
Figure 1E:
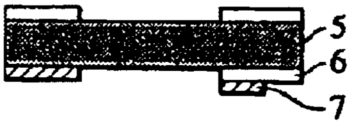
Figure 1E:
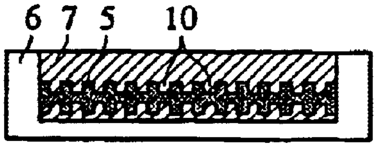
Figure 1F:
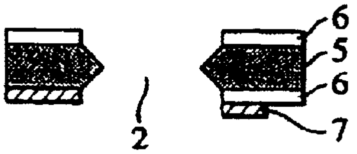
Figure 1F:
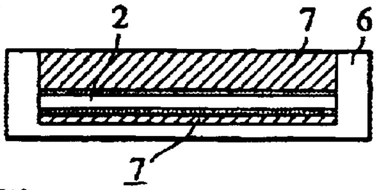
Figure 1G:
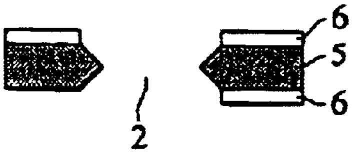
Figure 1G:
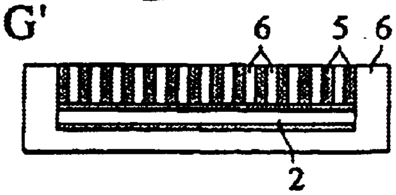
Figure 1H:
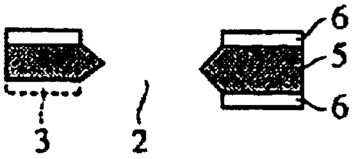
Figure 1H:
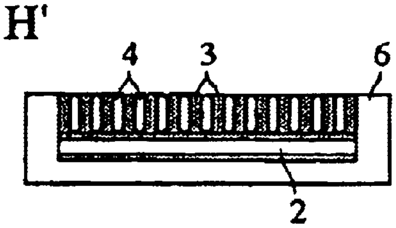
Figure 2A:
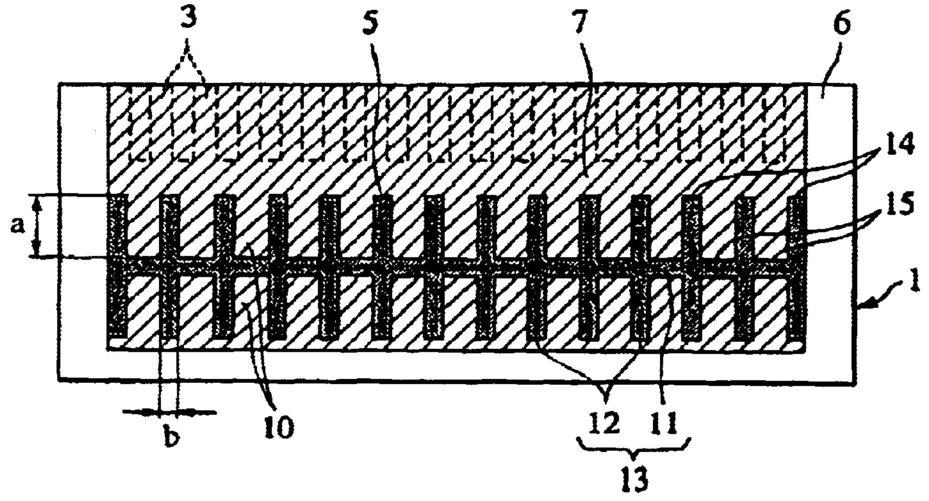
Figure 2B:
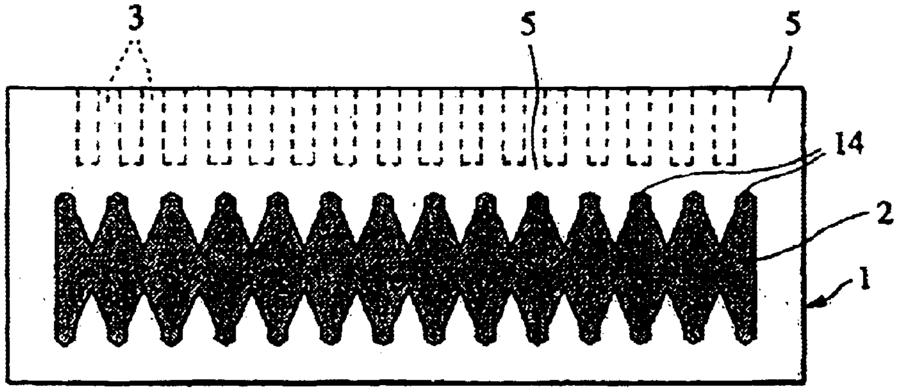
Figure 2C:
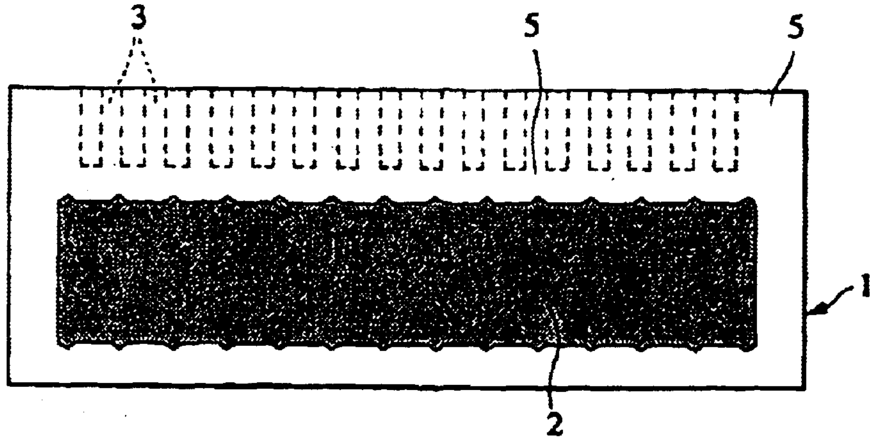

A first embodiment of the method for manufacturing a liquid jet recording head of the present invention is described by referring to FIGS. 1A to 1H and 1A' to 1H' and FIGS. 2A to 2C.

FIGS. 1A to 1H and 1A' to 1H' illustrate in a sequence a process of fabricating a top plate of a liquid jet recording head according to a method for manufacturing a liquid jet recording head of a first embodiment of the present invention. FIG. 2A to 2C are detailed illustrations for explaining steps of forming a liquid chamber according to the method for manufacturing the top plate of the first embodiment of the present invention. FIG. 2A illustrates a state in which a mask pattern for forming the liquid chamber is formed, FIG. 2B illustrates a state in which anisotropic etching for forming the liquid chamber is in progress, and FIG. 2C illustrates a resulting shape of the liquid chamber formed by anisotropic etching.

In FIGS. 1A to 1H and 1A' to 1H' for explaining a process of fabricating the top plate according to the first embodiment of the present invention. FIGS. 1A to 1H on the left side are cross-sectional views of the top plate along a plane parallel to the liquid discharging direction. FIGS. 1A' to 1H' on the right side are the bottom views of the lower surface (the surface provided with nozzles) of the top plate.

In FIGS. 1A and 1A', a silicon wafer 5 which is the material of the top plate 1 for forming a liquid chamber 2 and nozzles 3 has a <110> crystal orientation at the surface and a <111> crystal orientation in the longitudinal direction of the nozzle. A silicon dioxide ($SiO_2$) thin-film 6 of 1 $\mu$m in thickness is formed on both sides of the silicon wafer 5 by a deposition process such as a thermal oxidation process or a chemical vapor deposition (CVD) process, as shown in FIGS. 1B and 1B'. The silicon dioxide thin-film 6 functions as a mask layer during silicon anisotropic etching for forming the nozzles 3. Then, one surface (the surface which will be provided with nozzles, hereinafter referred to as the "nozzle surface") of the silicon dioxide thin-film 6 is patterned into a shape of the nozzles and the liquid chamber combined, and the other surface is patterned into a shape of the liquid chamber by using a standard photolithography technique (FIGS. 1C and 1C').

The nozzle surface is coated by a silicon nitride (SiN) layer 7 by a method such as a CVD method (FIGS. 1D and 1D') and is patterned into a shape of a liquid chamber (FIGS. 1E and 1E'). In this embodiment, the liquid chamber is formed as a ladder-shaped opening region 13, which is a ladder-shaped window exposing the silicon wafer 5 as shown in detail in FIG. 2A. The silicon wafer 5 is exposed in this region only. More particularly, a mask pattern for forming the liquid chamber in this embodiment comprises, as shown in FIG. 2A, comb-shaped compensation patterns 10 arranged to oppose each other from the nozzle side and the side opposite the nozzle side. The region to be opened is not rectangular and is a ladder-shaped opening region 13 comprising a narrow line 11 at the center portion of the predetermined region for forming the liquid chamber extending in parallel to the nozzle arraying direction, and a plurality of branches 12 which extend perpendicular to the nozzle arraying direction from one side of the line 11 to the other side of the line 11 (from the nozzle side to the side opposite the nozzle side).

Then, anisotropic etching is performed by simmering the wafer in an etchant such as a 22% tetramethylammonium hydroxide (TMAH) solution. Etching is performed along the exposed portion of the silicon wafer 5 (i.e., along the patterned shape) on both sides of the wafer, resulting in the formation of a through hole (the liquid chamber 2) as etching progresses in two opposing directions (FIGS. 1F, 1F', and 2C).

Now, the anisotropic etching process for forming the liquid chamber on the nozzle surface will be described in detail. In early stages, the silicon wafer 5 is etched according to the ladder-shaped opening region 13 which is the region between the patterned comb-shaped compensation patterns 10 arranged to oppose each other. Because the silicon wafer 5 is not etch-resistant in the nozzle arraying direction, the portions closest to the nozzles (indicated by reference numeral 14 in FIG. 2A) cannot be etched to be parallel to the nozzle arraying direction and are over-etched at an angle of 55° and at an angle of 71°. The comb-shaped compensation pattern 10 is etched according to the pattern of the silicon nitride layer 7 in early stages; however, because a rate of over-etching increases at the corner portions compared to the rate at the surface portions, over-etching gradually progresses at the corners of tip portions 15 close to the center of the liquid chamber in the comb-shaped compensation pattern 10. As a result, the shape of the liquid chamber at a middle stage of the anisotropic etching is as shown in FIG. 2B.

The silicon wafer 5 is further etched until the entire portion of the compensation pattern 10 is completely etched in order to form the liquid chamber 2 which is substantially rectangular, as shown in FIG. 2C.

Regarding the size of the comb-shaped compensation pattern 10, by setting a length a of each tooth portion to half the thickness of the top plate 1, a penetrating hole which serves as the liquid chamber can be formed before the over etching of the compensation pattern 10 is completed. An interval b between the teeth of the compensation pattern 10 depends on how much over etching is done at the portions 14 closest to the nozzles 3, and the amount of over etching is approximately 0.24 times the interval b between the tooth of the compensation pattern 10. Consequently, in order to eliminate variations in refilling rate due to the shape of the liquid chamber, the interval b between the teeth of the compensation pattern 10 is preferably 500 $\mu$m or less.

As is apparent from the above description, because the top plate of the present embodiment is penetrated and is provided with the substantially rectangular shaped liquid chamber having the sides substantially parallel to the nozzle arraying direction, raw material can be used effectively and the top plate having uniform liquid discharging characteristics can be obtained. it should be noted that the pattern at the recording liquid supplying side (i.e., the side opposite the nozzle surface) may be reduced in size so as to barely allow a hole to be penetrated by the anisotropic etching. Preferably, from the point of view of connecting to the recording liquid supplying member and securing the wafer strength during the fabrication of the top plate, the pattern at the recording liquid supplying side is smaller than that at the nozzle surface.

Next, the silicon nitride layer 7 on the nozzle surface is removed by etching (FIGS. 1G and 1G'). The nozzle pattern formed in the silicon dioxide thin-film 6 in FIGS. 1C and 1C' is exposed and anisotropic etching using a TMAH solution is performed once again to etch the part corresponding to the nozzles and to form the nozzles 3 (FIGS. 1H and 1H'). Although the liquid chamber 2 etched as shown in FIGS. 1F and 1F' may also be etched at this stage, the time period required for etching the nozzles 3 is relatively short compared to that required for etching the liquid chamber 2 and the shape of the liquid chamber is barely effected. Alternatively, the etching for forming the liquid chamber 2 may be performed for a shorter period of time by taking into consideration the period required for the nozzle etching so as to ultimately obtain the desired shape.

Each nozzle 3 obtained by anisotropic etching has a rectangular cross-section because there are <111> planes perpendicular to the wafer surface in the liquid discharging direction. However, there are no planes to inhibit the etching in the longitudinal direction of the nozzle. Thus, as a nozzle wall 4 between the nozzles is etched from both the nozzle rear-end side (the liquid chamber side) and the nozzle front-end side, the nozzle wall 4 is over-etched in the longitudinal direction so as to form an angular shape. Accordingly, the silicon dioxide thin-film 6 serving as the mask layer remains on the over etched portion. In order to remove the silicon dioxide thin-film 6, the wafer is sprayed with high-pressure air or high-pressure air containing water to remove only the silicon dioxide thin-film 6 without damaging the silicon wafer 5. A pressure of 100 to 200 kPa is sufficient for removing the thin-film of approximately 1 $\mu$m in thickness when the method of spraying water by high-pressure air is performed. The entire silicon dioxide thin-film 6 may also be removed by wet etching using a liquid mixture of ammonium fluoride and hydrofluoric acid.

Figure 7:
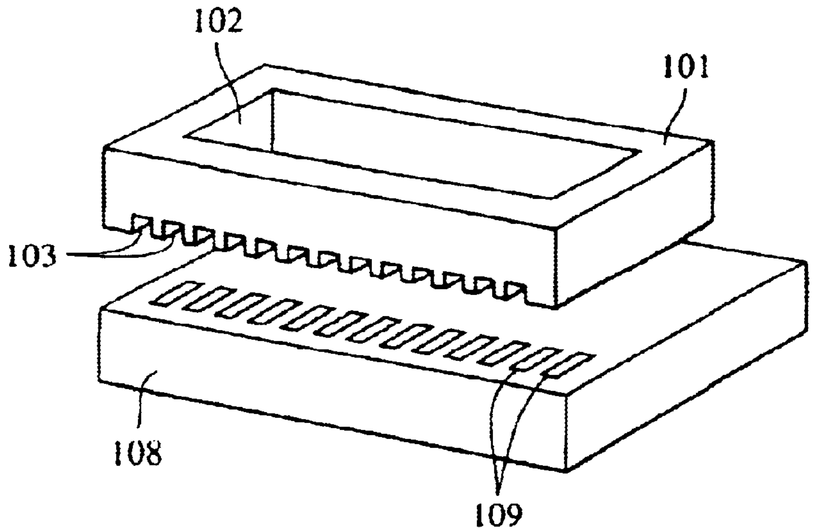
FIG. 7 is a perspective view showing an example of the structure of a liquid jet recording head.
Figure 8A:
FIG. 8A PRIOR ART
FIGS. 8A to 8H and 8A' to 8H' illustrate in a sequence a conventional process of fabricating a top plate according to a conventional method for manufacturing a liquid jet recording head.
Figure 8B:
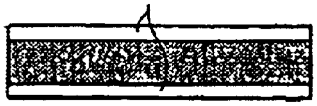
FIG. 8B PRIOR ART
Figure 8C:
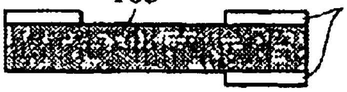
FIG. 8C PRIOR ART
Figure 8D:
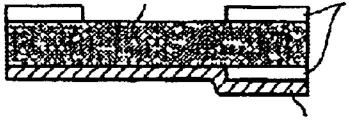
FIG. 8D PRIOR ART
Figure 8E:
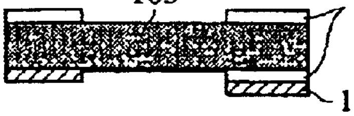
FIG. 8E PRIOR ART
Figure 8F:
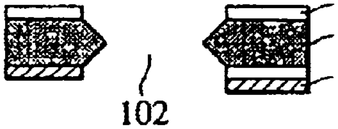
FIG. 8F PRIOR ART
Figure 8G:
FIG. 8G PRIOR ART
Figure 8H:
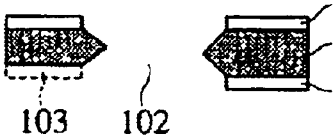
FIG. 8H PRIOR ART
Figure 8A:
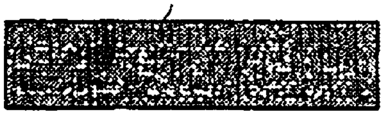
FIG. 8A' PRIOR ART
Figure 8B:
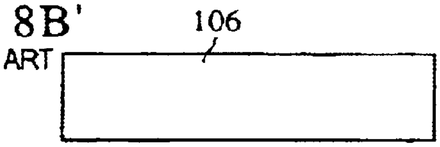
FIG. 8B' PRIOR ART
Figure 8C:
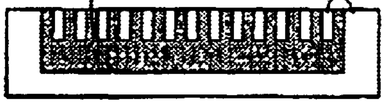
FIG. 8C' PRIOR ART
Figure 8D:
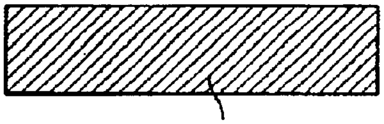
FIG. 8D' PRIOR ART
Figure 8E:
FIG. 8E' PRIOR ART
Figure 8F:
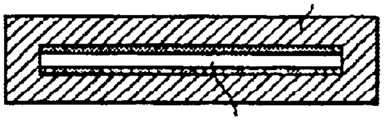
FIG. 8F' PRIOR ART
Figure 8G:
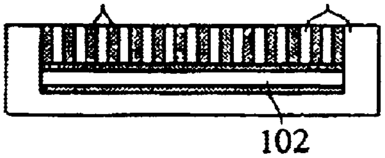
FIG. 8G' PRIOR ART
Figure 8H:
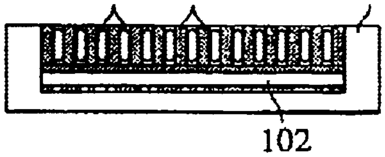
FIG. 8H' PRIOR ART
Figure 9A:
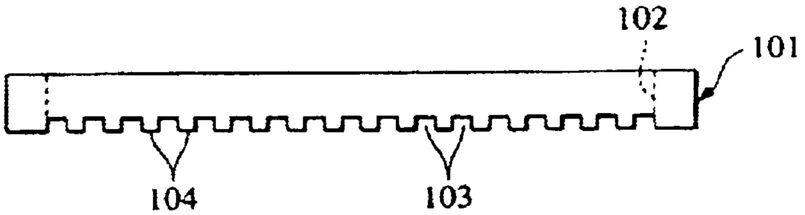
FIG. 9A PRIOR ART
FIGS. 9A to 9C illustrate the top plate fabricated by the conventional process.
Figure 9B:
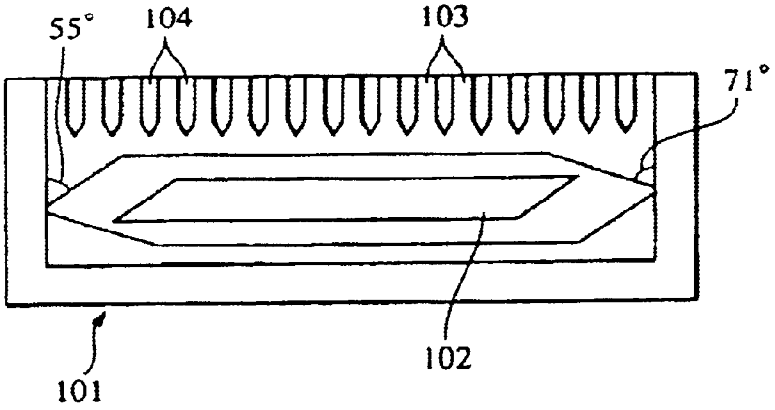
FIG. 9B PRIOR ART
Figure 9C:
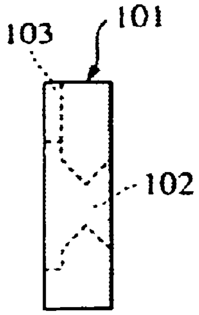
FIG. 9C PRIOR ART

After the top plate 1 provided with the liquid chamber 2 and the nozzles 3 is obtained, a liquid jet recording head is fabricated by closely jointing or by bonding the top plate 1 to a heater board as shown in FIG. 7.

As described above, according to this embodiment, the top plate (nozzle member) is formed by silicon anisotropic etching and can be manufactured in the form of a wafer. Thus, the top plate is suitable for mass production. Also, by forming nozzles using a photolithography technique, the nozzles can be precisely formed at high density. Since the shape of the liquid chamber at the nozzle surface of the top plate is substantially rectangular, the chip size of the top plate can be reduced and the number of top plates obtained from one wafer can be increased. Since there are no planes having angles relative to the nozzle arraying direction remaining in the vicinity of the liquid chamber side surfaces, contrary to the conventional art, the liquid discharging characteristics of every nozzle can be made uniform and uniform printing quality can be achieved.

Figure 3A:
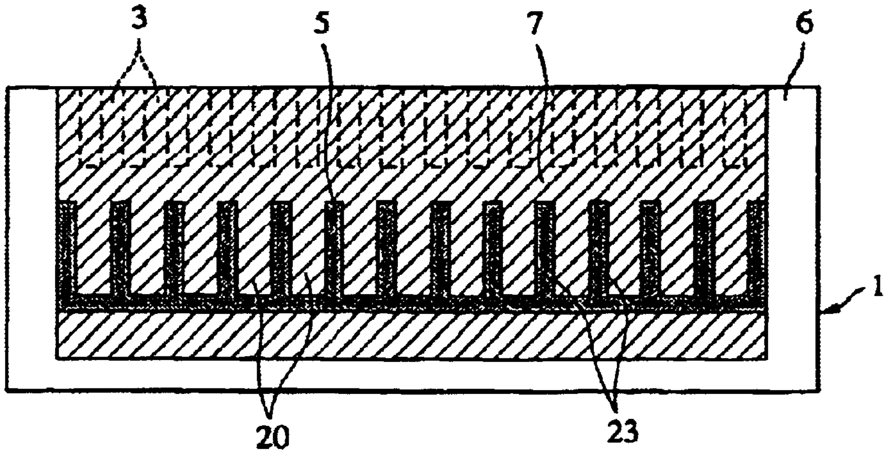
Figure 3B:
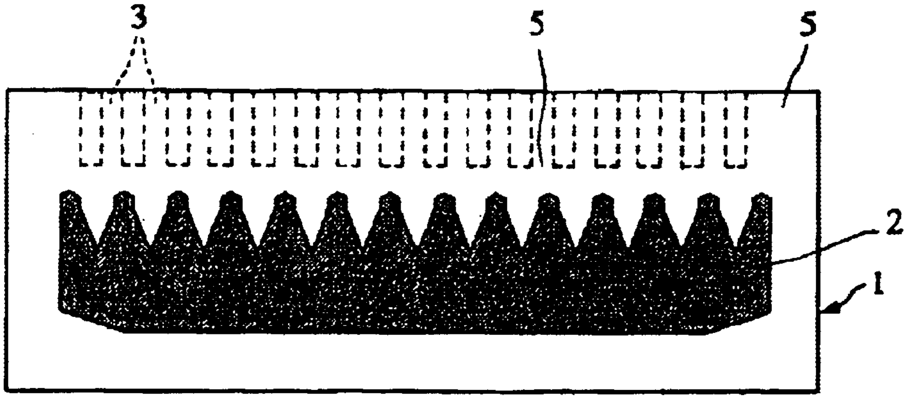
Figure 3C:
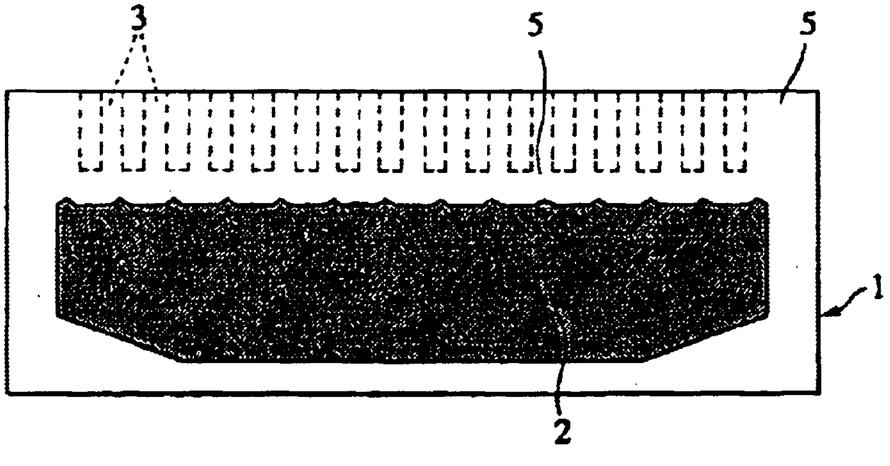
FIG. 3C illustrates a resulting shape of the liquid chamber formed by anisotropic etching.

A second embodiment of a method for manufacturing a liquid jet recording head of the present invention is now described with reference to FIGS. 3A to 3C.

In the above-described first embodiment, the compensation pattern 10 is formed so that the tooth portion thereof oppose those of the opposing pattern from the nozzle side and the side opposite the nozzle side. In the second embodiment, a comb-shaped compensation pattern 20 is provided only in the nozzle side due to the size of the top plate, as shown in FIG. 3A. The manner in which anisotropic etching is performed by using the compensation pattern 20 is identical to that in the first embodiment, and the resulting substantially rectangular shape of the liquid chamber 2 is also obtained in this embodiment. Since the rest of the process is similar to that of the first embodiment and the similar elements are given the same reference numerals, a detailed description is omitted.

Next, a third embodiment of a method for manufacturing a liquid jet recording head of the present invention is now described with reference to FIGS. 4A to 4C.

Figure 4A:
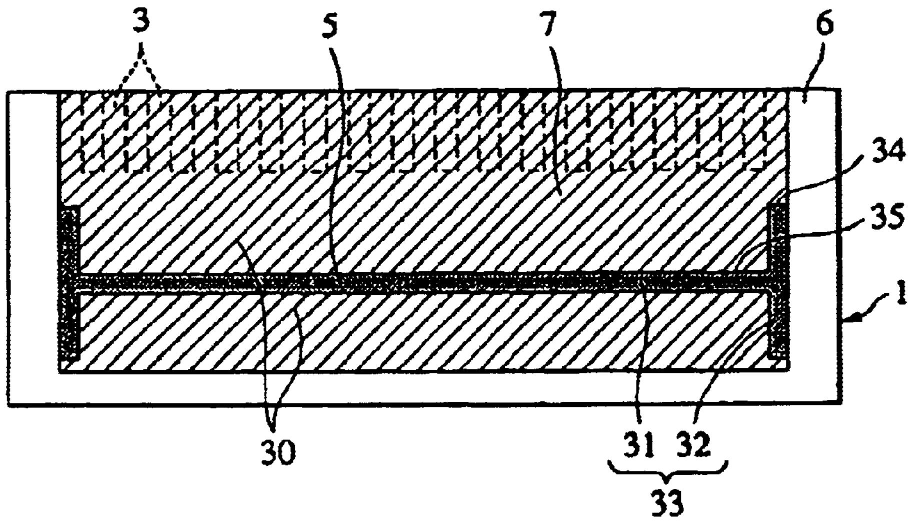
Figure 4B:
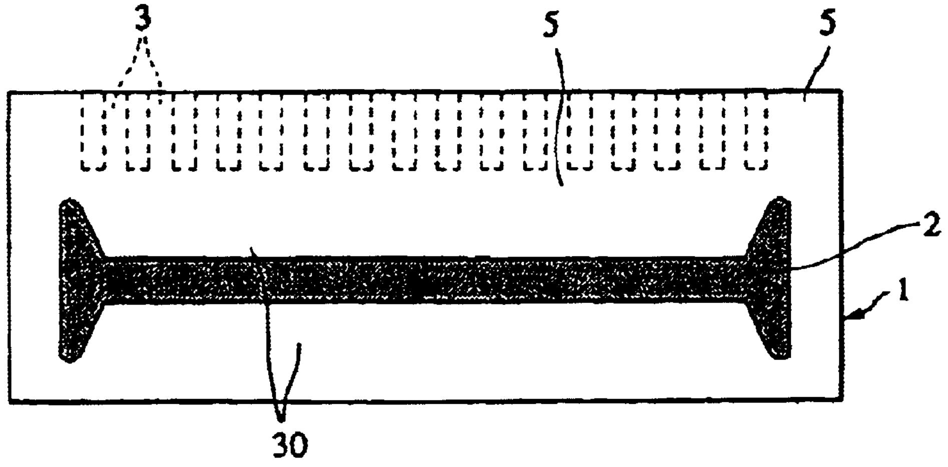
Figure 4C:
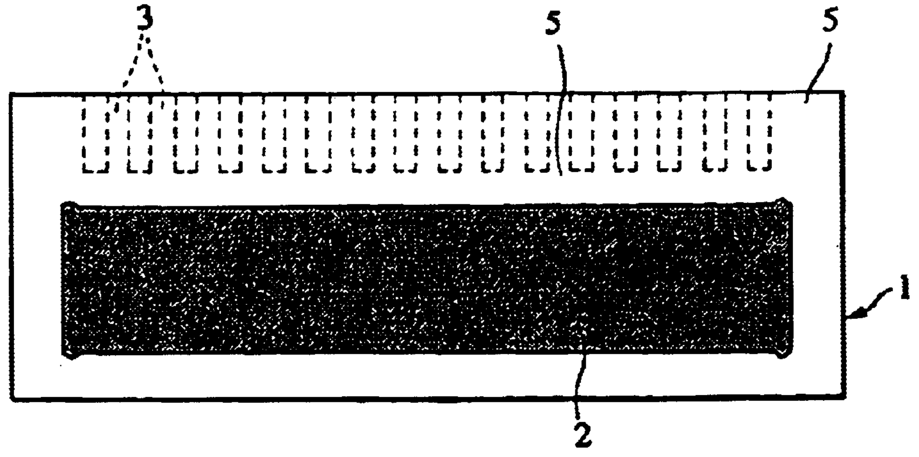

As shown in FIG. 4A, this embodiment differs from the first embodiment in that the compensation pattern is large so as to reduced the over-etching amount and that an opening region in the silicon nitride layer which determines the size of the liquid chamber is provided at each end portion of the liquid chamber. Since the rest of the process is similar to that of the first embodiment and the similar elements are given the same reference numerals, a detailed description is omitted.

The compensation patterns 30 of this embodiment are arrange to oppose each other from the nozzle side and the side opposite the nozzle side. There is a substantially H-shaped opening region 33 comprising a narrow line 31 at the center portion of a predetermined region for the liquid chamber extending in parallel to the nozzle arraying direction and branches 32 each of which is provided at the end portion of the liquid chamber and extends in a direction perpendicular to the nozzle arraying direction at both sides (the nozzle side and the side opposite the nozzle size) of the line 31.

When the top plate 1 provided with the compensation patterns 30 is immersed in an etchant such as a TMAH solution and is subjected to anisotropic etching as in the first embodiment, in portions 34 at the vicinity of the compensation pattern 30, the amount of over-etching is small, as in the case of the first embodiment. In portions 35 close to the nozzles of the compensation pattern 30, the over-etching gradually progresses from the corners. Since the over etching rate is increased in the corner portions compared to that in the flat portions, the liquid chamber is etched to have a shape shown in FIG. 4B and ultimately a shape shown in FIG. 4C is obtained.

When the compensation pattern 30 of this embodiment is employed, the over-etching rate is decreased. The compensation pattern of this embodiment is suitable for a top-plate chip with a reduced depth.

Figure 5A:
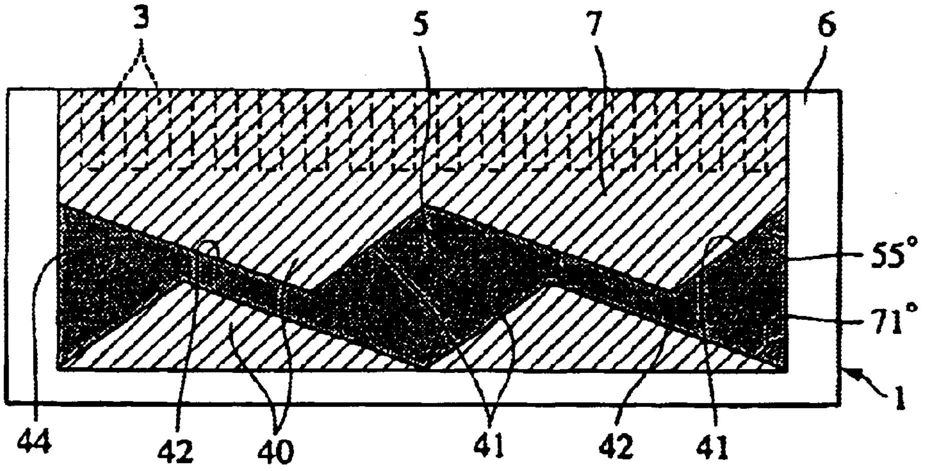
Figure 5B:
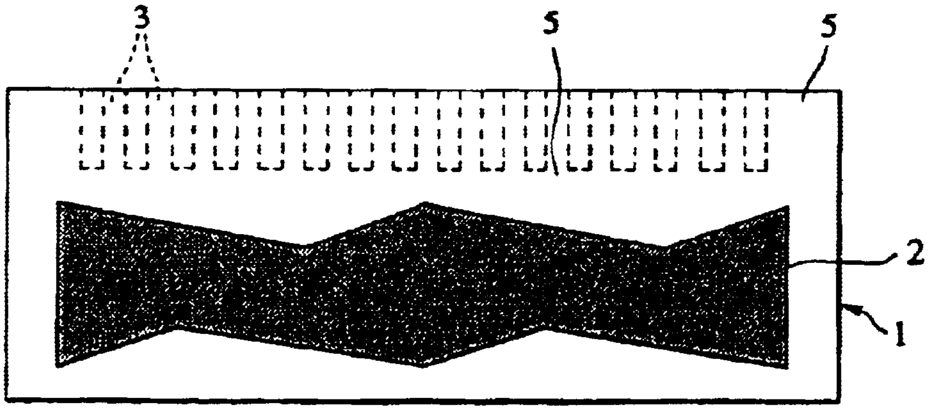
Figure 5C:
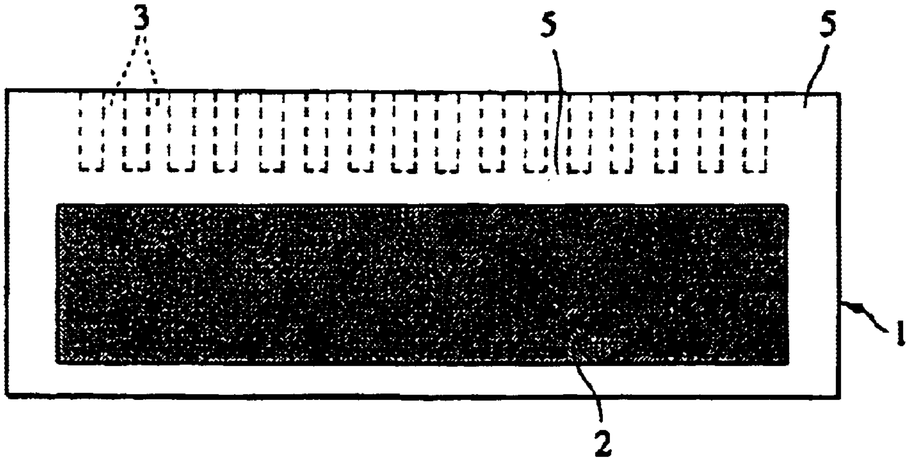

Next, a fourth embodiment of a method for manufacturing a liquid jet recording head of the present invention is described with reference to FIGS. 5A to 5C.

The pattern of this embodiment is designed along the <111> plane of the silicon wafer. Compensation patterns 40 are formed by lines 41 having an angle of 55° relative to the <111> plane in the nozzle direction and lines 42 having an angle of 71° relative to the same <111> plane. The compensation patterns 40 are arranged to oppose each other from the nozzle side and the side opposite the nozzle side to form an opening region 44 therebetween. The opening region 44 is provided in the center portion of a predetermined region for forming the liquid chamber. Since the rest of the process is similar to that of the first embodiment and the similar elements are given the same reference numerals, a detailed description is omitted.

By using the compensation patterns 40 of this embodiment, etching proceeds along the <111> plane and over-etching barely occurs in the vicinity of the nozzles. At the same time, as shown in FIG. 5B, over-etching is carried out from the corners so as to ultimately obtain the rectangular-shaped liquid chamber shown in FIG. 5C, as in the first embodiment.

Figure 6A:
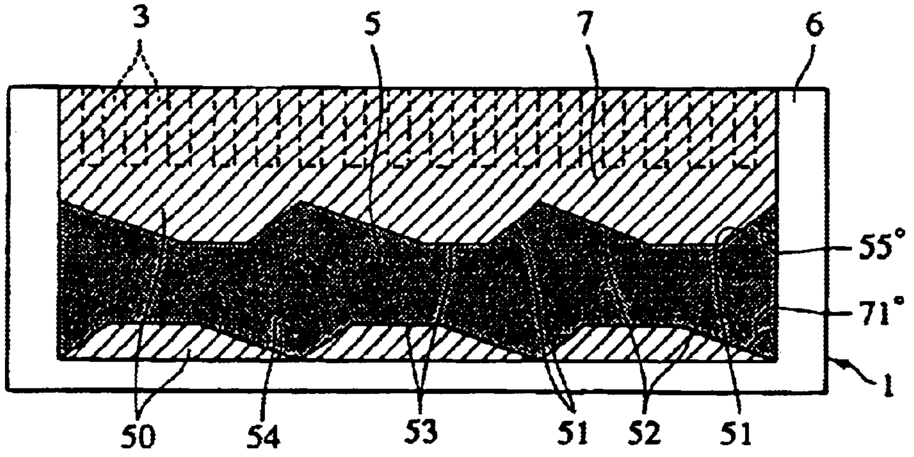
Figure 6B:
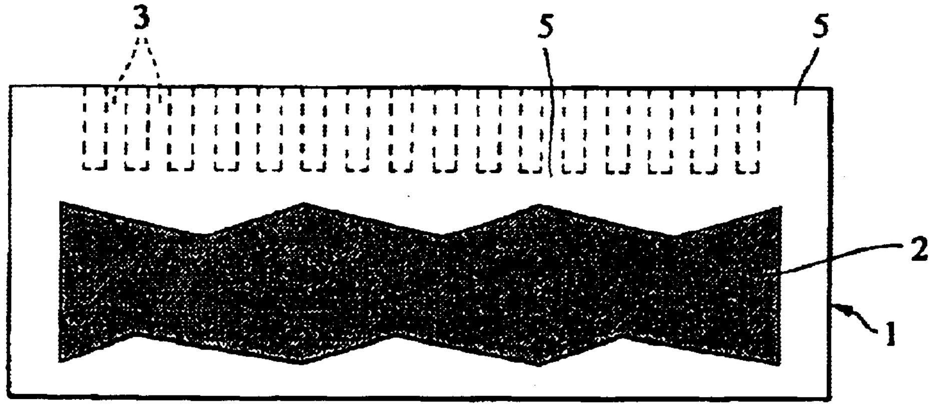

Next, a fifth embodiment of a method for manufacturing a liquid jet recording head of the present invention is described with reference to FIG. 6.

A pattern of this embodiment is designed by combining the pattern designed along the <111> plane of the silicon wafer and the pattern extending in the nozzle arraying direction. Compensation patterns 50 are formed by combining lines 51 having an angle of 55° relative to the <111> plane in the nozzle direction, lines 52 having an angle of 71° relative to the same <111> plane, and lines 53 which extend in parallel with the nozzle arraying direction. The thus formed compensation patterns 50 are arranged to oppose each other from the nozzle side and the side opposite the nozzle side. An opening region 54 is formed between the opposing compensation patterns 50 and at the center portion of the predetermined region for forming the liquid chamber. Since the rest of the process is similar to that of the first embodiment and the similar elements are given the same reference numerals, a detailed description is omitted.

Figure 6C:
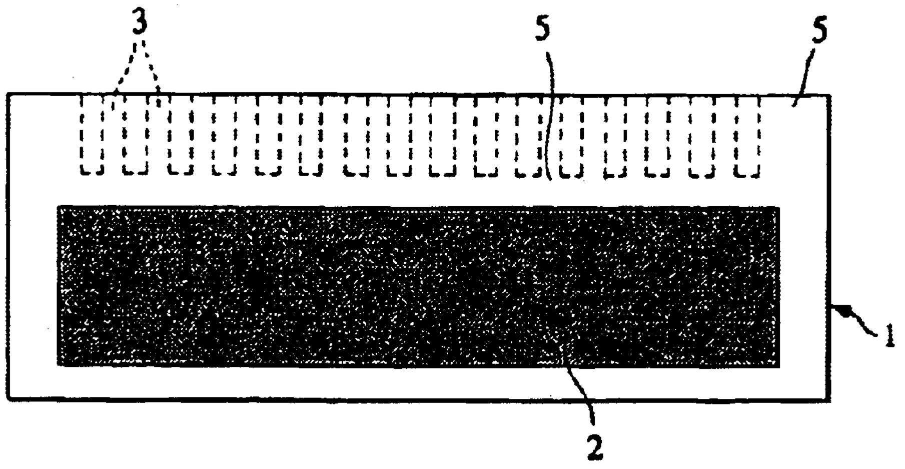

When a desired shape cannot be obtained due to the thickness of the top plate or the size of the liquid chamber by employing the compensation patterns 40 of the aforementioned fourth embodiment, the pattern designed along the <111> plane of the silicon wafer and the pattern in the nozzle arraying direction may be combined to adjust the rate of over-etching. The rectangular-shaped liquid chamber as shown in FIG. 6C can be ultimately obtained by using the compensation patterns 50 of the fifth embodiment.

The shape of the top plate (nozzle member) fabricated by the present invention is not limited to the shape shown in FIG. 7. For example, valves may be formed on the heater board in order to discharge the liquid efficiently. The top plate fabricated by the present invention is particularly suitable for forming valves since the perpendicular nozzle walls do not inhibit the valves from moving freely and rapidly.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for manufacturing a liquid jet recording head which comprises an element substrate provided with a plurality of discharge energy generating elements for applying discharging energy to a recording liquid in accordance with image data, a liquid chamber for storing the recording liquid, and a top plate having a plurality of nozzles and which is formed by jointing the element substrate and the top plate so that each of the discharge energy generating elements faces the respective nozzle, the method comprising the steps of:

forming, in an anisotropic-etching mask layer provided on a nozzle surface of the top plate, a compensation patterns extending over a portion of the top plate that is subsequently etched away to form the liquid chamber for storing the recording liquid; and over-etching the top plate by anisotropic etching using the compensation pattern as a mask to remove a part of the top plate masked by the compensation pattern prior to removing the compensation pattern to form the liquid chamber having a substantially rectangular shape at the nozzle surface of the top plate.

2. A method for manufacturing a liquid jet recording head according to claim 1, wherein the top plate comprises a silicon wafer having a <110> oriented surface.

3. A method for manufacturing a liquid jet recording head according to one of claims 1 and 2, wherein comb-shaped compensation patterns are formed and arranged to oppose each other so as to define a ladder-shaped opening region between the compensation patterns at the center portion of a part of the top plate that will be removed to form the liquid chamber.

4. A method for manufacturing a liquid jet recording head according to one of claims 1 and 2, wherein compensation patterns are formed and arranged to oppose each other so as to define a substantially H-shaped opening region between the compensation patterns at the center portion of a part of the top plate that will be removed to form the liquid chamber.

5. A method for manufacturing a liquid jet recording head according to one of claims 1 and 2, wherein the compensation pattern is designed by combining at least one line having an angle of 55° relative to a <111> plane in the nozzle direction of the silicon wafer and at least one line having an angle of 71° relative to the same <111> plane, and the compensation patterns are formed and arranged to oppose each other separated by an opening region in the center portion of a part of the top plate that will be removed to form the liquid chamber.

6. A method for manufacturing a liquid jet recording head according to one of claims 1 and 2, wherein each of the compensation pattern is designed by combining at least one line having an angle of 55° relative to a <111> plane in the nozzle direction of the silicon wafer, at least one line having an angle of 71° relative to the same <111> plane, and at least one line parallel to the nozzle arraying direction, and compensation patterns are formed and arranged to oppose each other separated by an opening region in the center portion of a part of the top plate that will be removed to form the liquid chamber.

7. A method for manufacturing a liquid jet recording head according to claim 1, further comprising the step of removing the compensation pattern after the liquid chamber is formed.

* * * * *

UNITED STATES PATENT AND TRADEMARK OFFICE

CERTIFICATE OF CORRECTION

PATENT NO. : 6,958,125 B2
DATED : October 25, 2005
INVENTOR(S) : Tomoyuki Hiroki It is certified that error appears in the above-identified patent and that said Letters Patent is hereby corrected as shown below:

Column 5,
Line 26, "according" should read -- according to --.

Column 8,
Line 40, "reduced" should read -- reduce --;
Line 48, "arrange" should read -- arranged --; and
Line 57, "size)" should read -- side) --.

Column 10,
Line 19, "jointing" should read -- joining --;
Line 25, "patterns" should read -- pattern --; and
Line 64, "each of" should be deleted.

Signed and Sealed this

Twenty-eighth Day of March, 2006

JON W. DUDAS
*Director of the United States Patent and Trademark Office*